United States Patent
Kim et al.

(10) Patent No.: US 10,505,612 B2
(45) Date of Patent: Dec. 10, 2019

(54) METHOD FOR FEEDING BACK PARTIAL CSIS FROM USER EQUIPMENT IN WIRELESS COMMUNICATION SYSTEM AND AN APPARATUS FOR THE SAME

(71) Applicant: LG ELECTRONICS INC., Seoul (KR)

(72) Inventors: Hyungtae Kim, Seoul (KR); Kijun Kim, Seoul (KR); Jonghyun Park, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 15/515,997

(22) PCT Filed: Dec. 2, 2015

(86) PCT No.: PCT/KR2015/013044
§ 371 (c)(1),
(2) Date: Mar. 30, 2017

(87) PCT Pub. No.: WO2016/089106
PCT Pub. Date: Jun. 9, 2016

(65) Prior Publication Data
US 2017/0294950 A1   Oct. 12, 2017

Related U.S. Application Data

(60) Provisional application No. 62/087,765, filed on Dec. 4, 2014.

(51) Int. Cl.
*H04B 7/06* (2006.01)
*H04B 7/155* (2006.01)
(Continued)

(52) U.S. Cl.
CPC ......... *H04B 7/0626* (2013.01); *H04B 7/0632* (2013.01); *H04B 7/15542* (2013.01);
(Continued)

(58) Field of Classification Search
CPC .. H04B 7/0626; H04B 7/0632; H04B 7/0421; H04B 7/15542; H04B 3/46; H04B 17/00;
(Continued)

(56) References Cited

U.S. PATENT DOCUMENTS

| 2010/0227561 A1* | 9/2010 | Chakraborty ......... H04L 5/0007 455/63.1 |
| 2012/0207199 A1* | 8/2012 | Guo ...................... H04L 1/0026 375/224 |

(Continued)

FOREIGN PATENT DOCUMENTS

| JP | 2011082709 | 4/2011 | |
| WO | WO2012022247 | * 2/2012 | ............. H04W 4/00 |
| WO | 2013109110 | 7/2013 | |

OTHER PUBLICATIONS

PCT International Application No. PCT/KR2015/013044, Notification of Transmittal of the International Search Report and the Written Opinion of the International Searching Authority, or Declaration dated Mar. 21, 2016, 11 pages.

(Continued)

*Primary Examiner* — Warner Wong
(74) *Attorney, Agent, or Firm* — Lee Hong Degerman Kang & Waimey

(57) ABSTRACT

A method for reporting channel state information (CSI) from a user equipment to a base station in a wireless communication system is disclosed. The method comprises the steps of configuring a first feedback chain corresponding to a first channel state information-reference signal (CSI-RS) and a second feedback chain corresponding to a second CSI-RS through higher layer signaling; generating a first partial CSI and a second partial CSI corresponding to each of the feedback chains by using the first and second CSI-RSs received from the base station; periodically reporting the first partial CSI to the base station in accordance with the first feedback chain; and aperiodically reporting the second partial CSI to the base station in accordance with the second feedback chain.

6 Claims, 14 Drawing Sheets

(A) CONTROL-PLANE PROTOCOL STACK (B) USER-PLANE PROTOCOL STACK

(51) Int. Cl.
*H04W 72/02* (2009.01)
*H04W 24/10* (2009.01)
*H04B 7/0417* (2017.01)

(52) U.S. Cl.
CPC ........... *H04W 72/02* (2013.01); *H04B 7/0421* (2013.01); *H04W 24/10* (2013.01)

(58) Field of Classification Search
CPC .. H04B 17/101; H04B 17/18; H04B 10/0795; H04B 10/0775; H04W 72/02; H04W 24/10; H04L 43/00
See application file for complete search history.

(56) References Cited

U.S. PATENT DOCUMENTS

| | | |
|---|---|---|
| 2012/0328035 A1 | 12/2012 | Yoon et al. |
| 2013/0114554 A1* | 5/2013 | Yang .................... H04W 24/10 370/329 |
| 2013/0195008 A1 | 8/2013 | Pelletier et al. |
| 2013/0231115 A1 | 9/2013 | Lin |
| 2013/0301450 A1* | 11/2013 | Geirhofer ............. H04B 7/024 370/252 |
| 2013/0336214 A1* | 12/2013 | Sayana .................. H04B 7/024 370/328 |
| 2014/0192917 A1 | 7/2014 | Nam et al. |
| 2014/0233419 A1* | 8/2014 | Cheng .................. H04L 5/0053 370/252 |
| 2015/0110029 A1* | 4/2015 | Hwang ................. H04L 1/0026 370/329 |
| 2015/0207604 A1* | 7/2015 | Sun ...................... H04B 7/0626 370/329 |
| 2016/0100406 A1* | 4/2016 | Chen ................. H04W 72/0453 370/329 |
| 2016/0205579 A1* | 7/2016 | Cheng .................. H04L 5/0057 370/252 |

OTHER PUBLICATIONS

European Patent Office Application Serial No. 15866132.2, Search Report dated Jul. 23, 2018, 8 pages.

* cited by examiner

FIG. 2
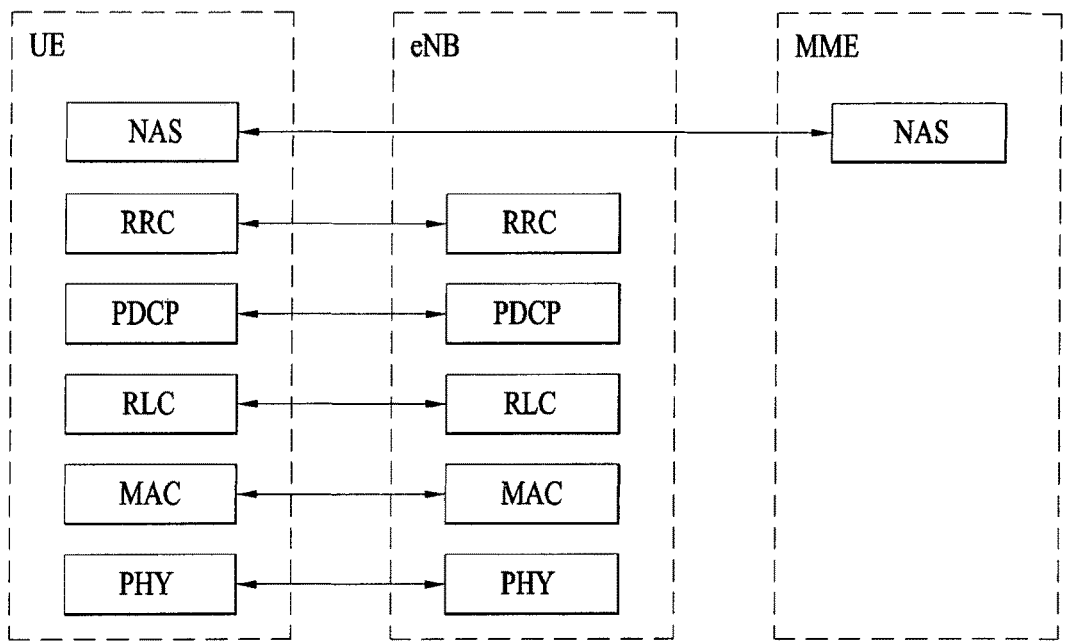
(A) CONTROL-PLANE PROTOCOL STACK
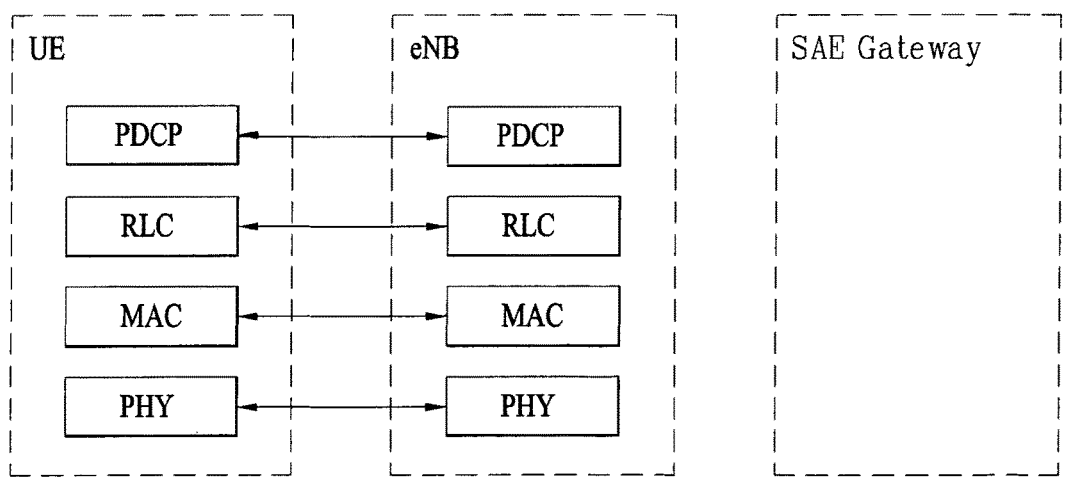
(B) USER-PLANE PROTOCOL STACK

◩ : DMRS GROUP 1

⊠ : DMRS GROUP 2

METHOD FOR FEEDING BACK PARTIAL CSIS FROM USER EQUIPMENT IN WIRELESS COMMUNICATION SYSTEM AND AN APPARATUS FOR THE SAME

CROSS-REFERENCE TO RELATED APPLICATIONS

This application is the National Stage filing under 35 U.S.C. 371 of International Application No. PCT/KR2015/013044, filed on Dec. 2, 2015, which claims the benefit of U.S. Provisional Application No. 62/087,765, filed on Dec. 4, 2014, the contents of which are all hereby incorporated by reference herein in its entirety.

TECHNICAL FIELD

The present invention relates to a wireless communication system, and more particularly, to a method for feeding back partial CSIs from a user equipment in a wireless communication system and an apparatus for the same.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARM)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, hereinafter, an object of the present invention is to provide a method for feeding back partial CSIs from a user equipment in a wireless communication system and an apparatus for the same.

Technical Solution

In one aspect of the present invention, a method for reporting channel state information (CSI) from a user equipment to a base station in a wireless communication system comprises the steps of configuring a first feedback chain corresponding to a first channel state information-reference signal (CSI-RS) and a second feedback chain corresponding to a second CSI-RS through higher layer signaling; generating a first partial CSI and a second partial CSI corresponding to each of the feedback chains by using the first and second CSI-RSs received from the base station; periodically reporting the first partial CSI to the base station in accordance with the first feedback chain; and aperiodically reporting the second partial CSI to the base station in accordance with the second feedback chain.

Preferably, the step of periodically reporting the first partial CSI may include transmitting a triggering request message for reporting of the second partial CSI to the base station, and the step of aperiodically reporting the second partial CSI may include receiving a triggering message for reporting of the second partial CSI from the base station.

More preferably, if the first partial CSI and the second partial CSI are reported at the same subframe, the first partial CSI and the second partial CSI may together be reported to the base station through the second feedback chain. Also, the triggering request message for reporting of the second partial CSI may be transmitted to the base station together with RI (rank indicator) of the first partial CSI.

Additionally, the triggering request message for reporting of the second partial CSI may include information indicating strength of the triggering request.

Moreover, the method may further comprise the step of receiving a response signal as to whether the second partial CSI is received, from the base station.

In another aspect of the present invention, a user equipment in a wireless communication system comprises a wireless communication module for transmitting and receiving a signal to and from a base station; and a processor, wherein the processor controls the wireless communication module to configure a first feedback chain corresponding to a first channel state information-reference signal (CSI-RS) and a second feedback chain corresponding to a second CSI-RS through higher layer signaling, generate a first partial CSI and a second partial CSI corresponding to each of the feedback chains by using the first and second CSI-RSs received from the base station, periodically report the first partial CSI to the base station in accordance with the first feedback chain, and aperiodically report the second partial CSI to the base station in accordance with the second feedback chain.

Preferably, the processor controls the wireless communication module to transmit a triggering request message for reporting of the second partial CSI to the base station through the first feedback chain and receive a triggering message for reporting of the second partial CSI from the base station.

More preferably, if the first partial CSI and the second partial CSI are reported at the same subframe, the processor controls the wireless communication module to report the first partial CSI and the second partial CSI to the base station through the second feedback chain.

Advantageous Effects

According to the embodiment of the present invention, in a wireless communication system, especially a massive MIMO (Multi Input Multi Output) communication system, CSI overhead that may be increased can efficiently be dealt, whereby CSI can be reported to a base station.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
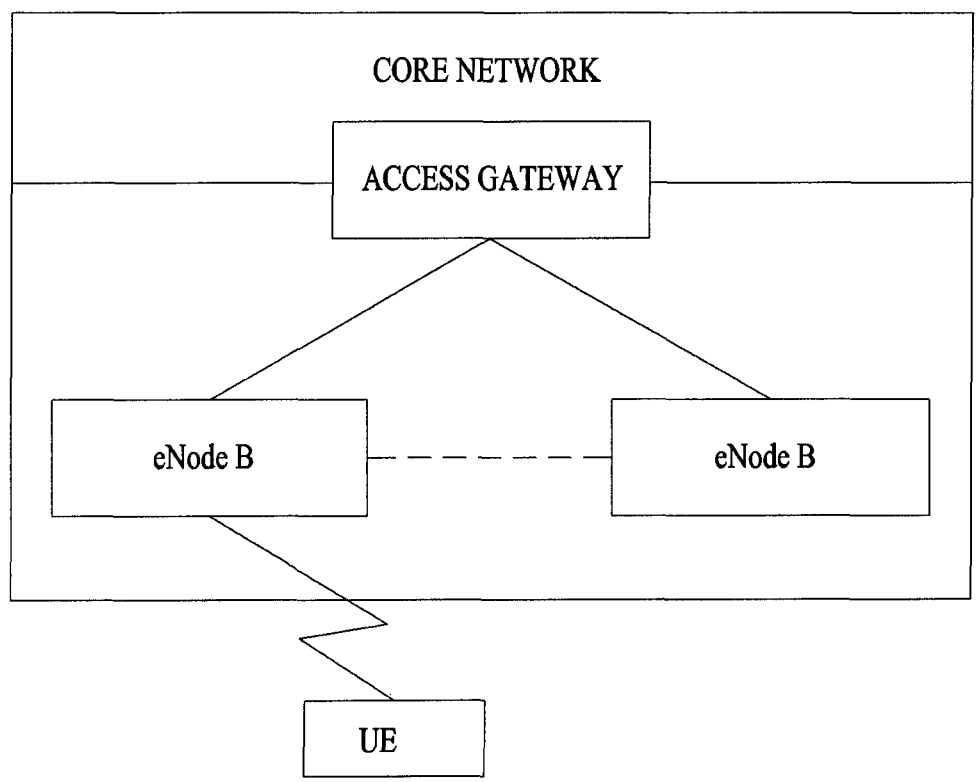
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers.

A radio bearer refers to a service provided by the second layer to transmit data between the UE and the network. To this end, the RRC layer of the UE and the RRC layer of the network exchange RRC messages. The UE is in an RRC connected mode if an RRC connection, has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
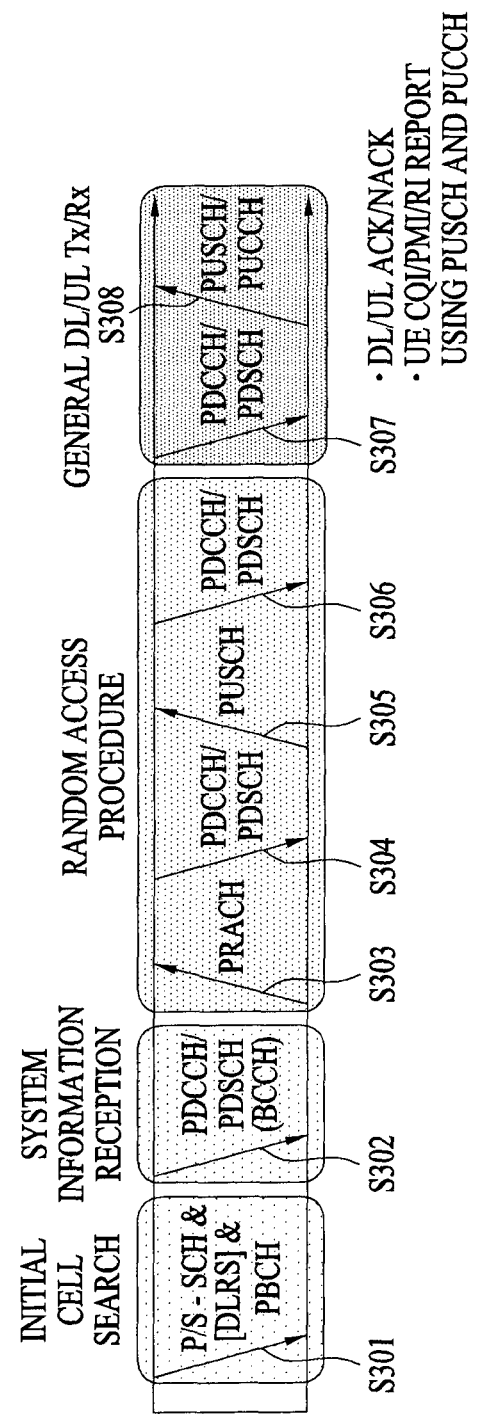
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
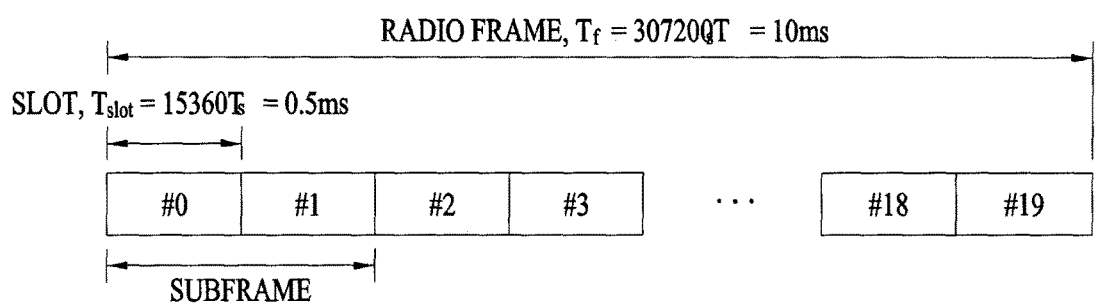
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
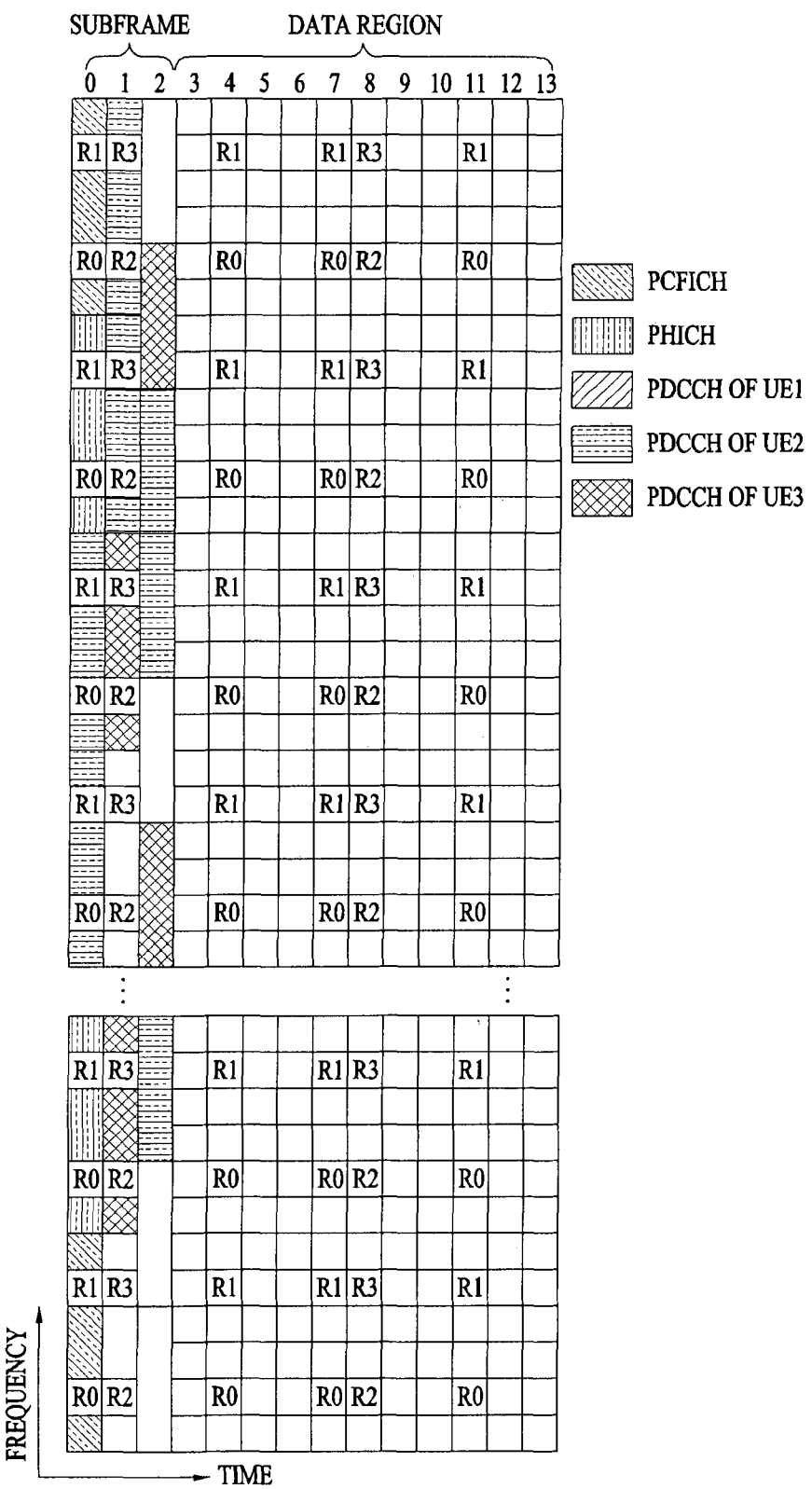
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
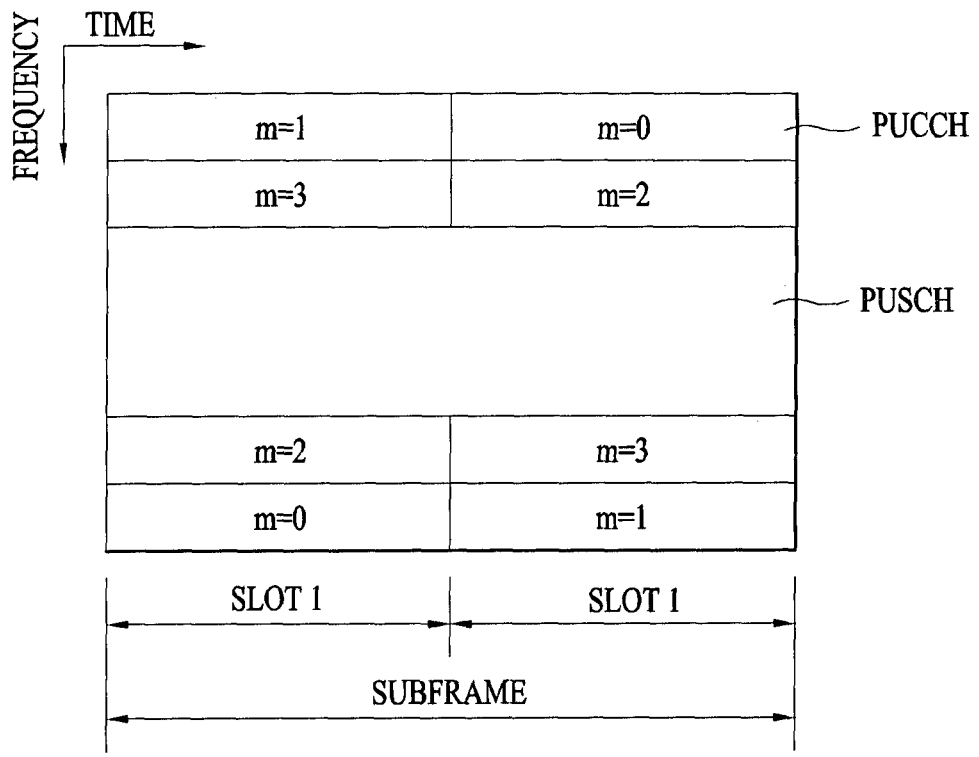
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
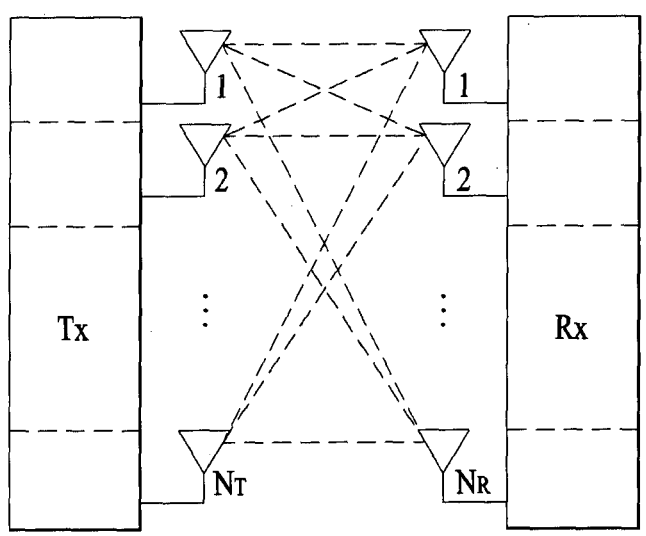
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{S}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
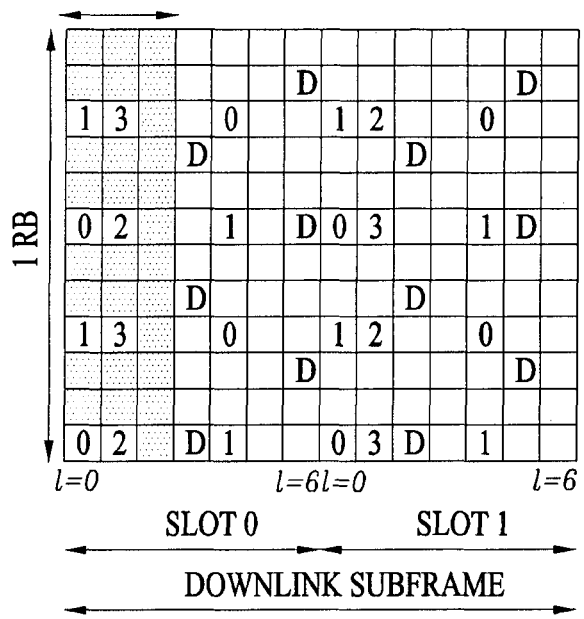
FIGS. 8 and 9 are diagrams illustrating DL RS configurations in an LTE system supporting DL transmission through four antennas.
Figure 9:
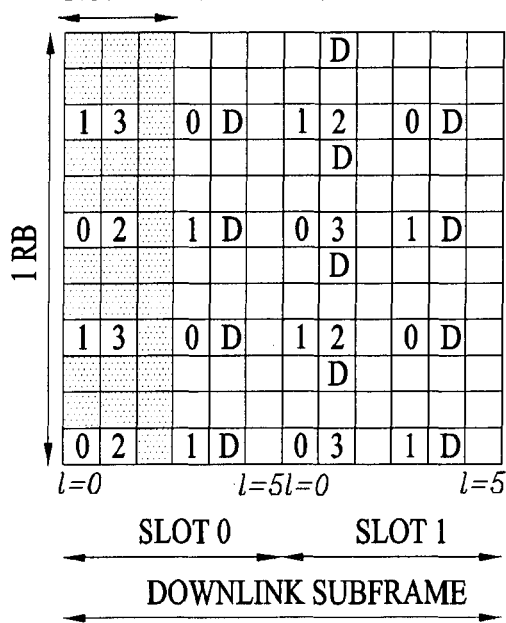

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
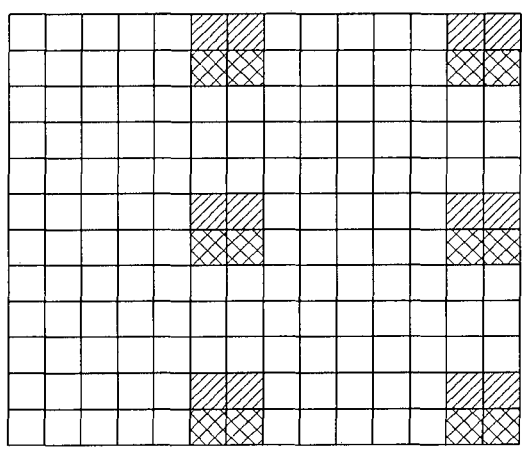
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 1 and Table 2 list CSI-RS configurations defined in the 3GPP standard. Specifically, Table 1 lists CSI-RS configurations in the case of a normal CP and Table 2 lists CSI-RS configurations in the case of an extended CP.

TABLE 1

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |

TABLE 1-continued

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 | 22 | (7, 1) | 1 | (7, 1) | 1 | (7, 1) | 1 |
| only | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

TABLE 2

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame | 0 | (11, 4) | 0 | (11, 4) | 0 | (11, 4) | 0 |
| structure | 1 | (9, 4) | 0 | (9, 4) | 0 | (9, 4) | 0 |
| type 1 and 2 | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 | 18 | (9, 1) | 1 | (9, 1) | 1 | (9, 1) | 1 |
| only | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

Figure 11:
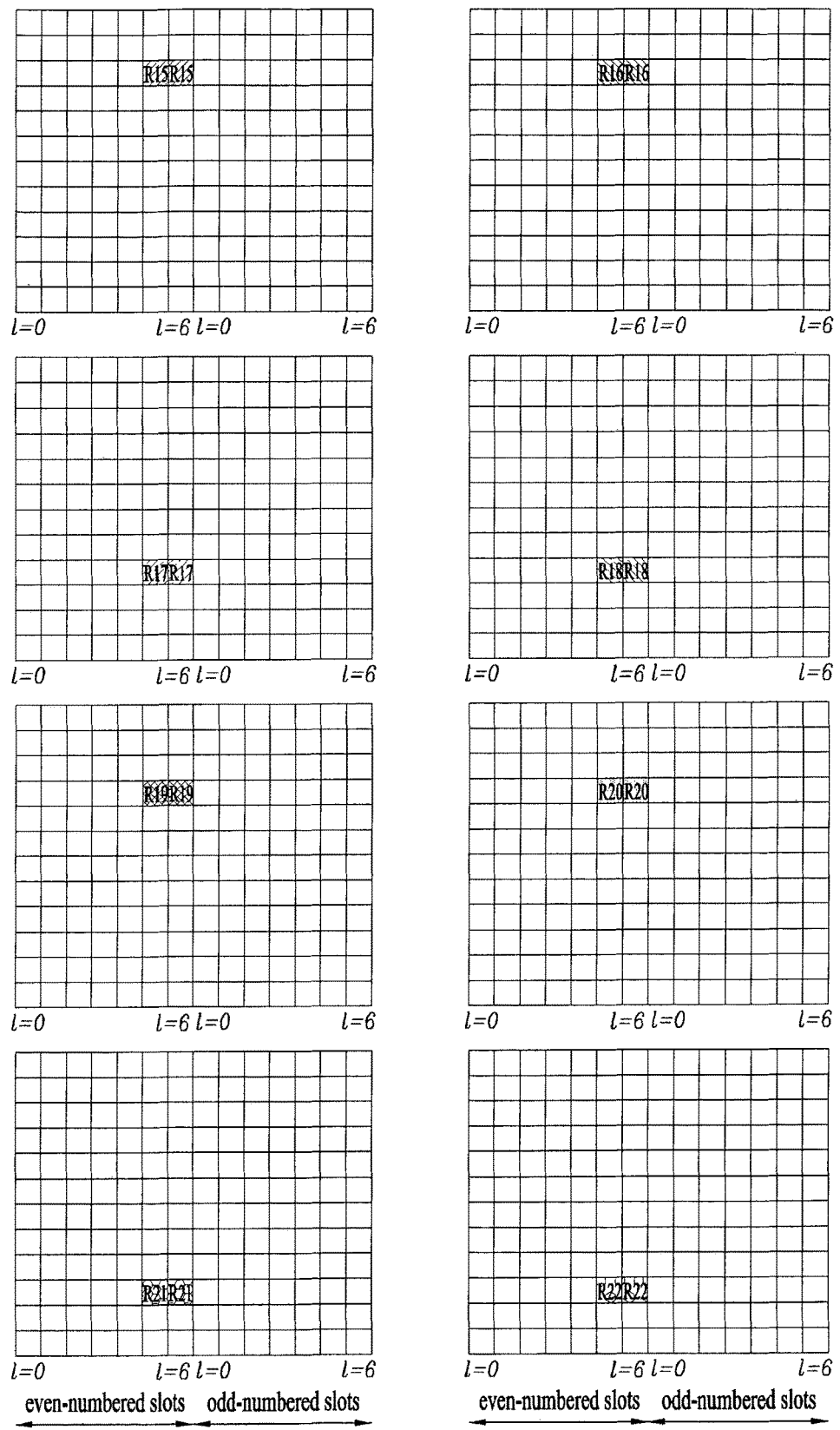
FIG. 11 illustrates CSI-RS configuration #0 of DL CSI-RS configurations defined in the current 3GPP standard.

In Table 1 and Table 2, (k',l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$ and a subframe offset $\Delta_{CSI-RS}$. Table 3 lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Meanwhile, information about a zero power (ZP) CSI-RS illustrated in Table 4 is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CSI-RS transmission periodicity and subframe offset of a ZP CSI-RS by $I_{CSI-RS}$ illustrated in Table 3. zeroTxPowerResourceConfigList indicates a ZP CSI-RS configuration. The elements of this bitmap indicate the respective configurations included in the columns for four CSI-RS antenna ports in Table 1 or Table 2. A normal CSI-RS other than ZP CSI-RS is referred to as non zero-power (NZP) CSI-RS. In other words, according to the current 3GPP standard document, a ZP CSI-RS is defined as only a case in which the number of antenna ports for a CSI-RS is four.

TABLE 4

```
-- ASN1START
CSI-RS-Config-r10 ::=    SEQUENCE {
    csi-RS-r10                      CHOICE {
        ...
    }
    zeroTxPowerCSI-RS-r10           CHOICE {
        release                         NULL,
        setup                           SEQUENCE {
            zeroTxPowerResourceConfigList-r10  BIT STRING (SIZE (16)),
            zeroTxPowerSubframeConfig-r10      INTEGER (0..154)
        }
    }
}
-- ASN1STOP
```

The current 3GPP standard defines modulation orders and cording rates for respective CQI indexes as illustrated in Table 5.

TABLE 5

| CQI index | modulation | code rate × 1024 | efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |

TABLE 5-continued

| CQI index | modulation | code rate × 1024 | efficiency |
| --- | --- | --- | --- |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 12:
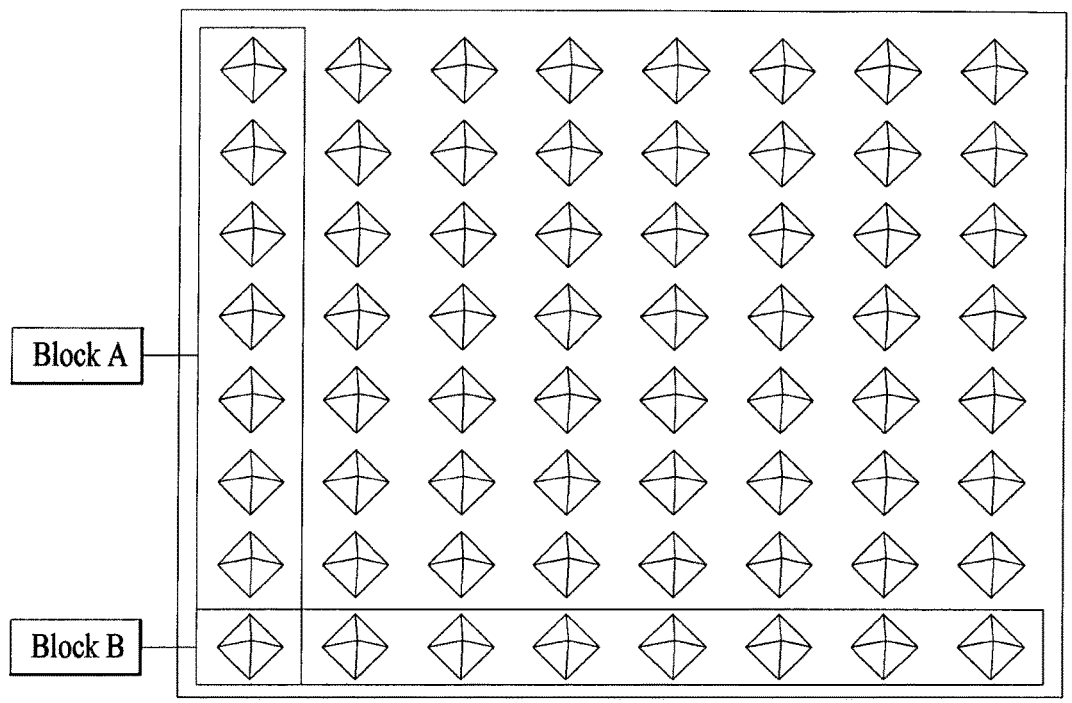
FIG. 12 illustrates an example of implementation of the 2D-AAS.

FIG. 12 illustrates an example of implementation of the 2D-AAS. In particular, FIG. 12 presumes a co-polarized antenna array in which each antenna element has the same polarization.

Referring to FIG. 12, the 2D-AAS is expected to be constructed as a system having a plurality of antennas by installing antennas in a vertical direction and a horizontal direction. When the 2D-AAS is introduced, a transmitting end needs to transmit a particular reference signal (RS) (e.g., a CSI-RS) to report a channel from the transmitting end to a receiving end to the receiving end. In a current LTE system, the CSI-RS is designed as a 1-port, 2-port, 4-port, or 8-port CSI-RS. Each n-ports CSI-RS (n>1) needs to use n REs in one RB.

The 2D-AAS illustrated in FIG. 12 has a total of 64 antennas including eight antennas in the vertical direction and eight antennas in the horizontal direction. In this case, 64 REs need to be used for the CSI-RS in one RB in a conventional scheme. Therefore, CSI-RS overhead according to the number of antennas may be a problem.

In a method proposed to solve this problem, channels from remaining ports are estimated using some CSI-RS ports. There are several schemes for the method. The present invention presumes a circumstance in which a channel from the 2D-AAS to the receiving end is estimated using the Kronecker product as in the following Equation 8.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \quad \text{[Equation 8]}$$

In Equation 8, H denotes a whole channel from the transmitting end to the receiving end, and $H_T^{(j)}$ denotes a channel from the transmitting end to a j th receive antenna. $H_V^{(j)}$ and $H_H^{(j)}$ denote channels transmitted from antenna elements (or ports) in the vertical direction and the horizontal direction to a j th antenna of the receiving end.

Referring to FIG. 12, $H_V^{(j)}$ denotes channels from antennas of block A to the j th antenna of the receiving end on the assumption that only the antennas of block A are present, and $H_H^{(j)}$ denotes channels from antennas of block B to the j th antenna of the receiving end on the assumption that only the antennas of block B are present. Description is given from the point of view of one arbitrary receive antenna for convenience of description, and all processes are applicable to all other receive antennas.

Hereinafter, description will be given using only a channel from the transmitting end to one arbitrary receive antenna from which an index (j) is eliminated as in the following Equation 9.

$$H_T = H_V \otimes H_H \quad \text{[Equation 9]}$$

Equation 9 is an equation for description of the present invention, and it is clear that the present invention may be applied even when an actual channel is different from Equation 9.

The above-described scheme of estimating a channel using the kronecker product is a method of configuring two CSI-RSs by configuring one CSI-RS having antenna ports $N_V$ in the vertical direction as in block A of FIG. 12 and one CSI-RS having antenna ports $N_H$ in the horizontal direction as in block B of FIG. 12. The receiving end may measure two channel matrices $H_V$ and $H_H$ using the two received CSI-RSs, and then estimate an actual 3D channel using the Kronecker product of the two channel matrices as in Equation 9. $N_V$ denotes the number of antennas in the vertical direction, and $N_H$ denotes the number of antennas in the horizontal direction. When this method is used, it is possible to inform the receiving end of 3D channels from 64 antenna ports using the existing 2-port, 4-port, or 8-port CSI-RS.

Meanwhile, it is possible to consider a cross-polarized antenna array (X-pol AA) instead of the co-polarized antenna array illustrated in FIG. 12.

Figure 13:
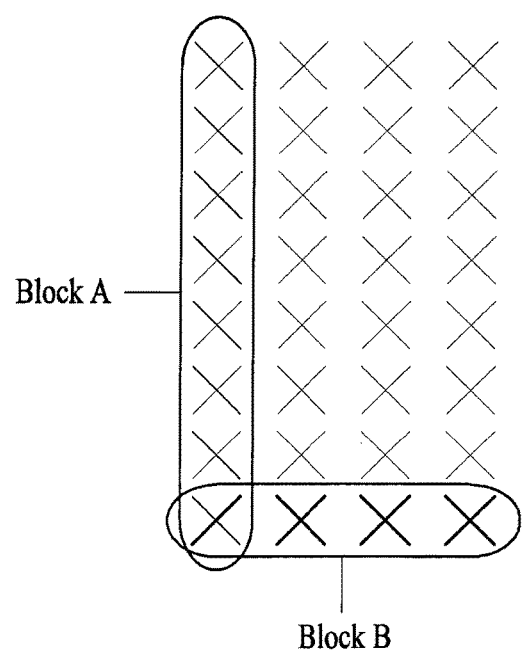
FIG. 13 is an example of implementation of the cross-polarized antenna array having 64 antenna elements.

FIG. 13 is an example of implementation of the cross-polarized antenna array having 64 antenna elements. Similarly to FIG. 12, it can be understood that Group A and Group B are configured for respective antenna arrays in the vertical direction and the horizontal direction.

In summary, in an N-Tx massive MIMO environment in which the base station has a great number of transmit antennas, an N-Tx CSI-RS and an N-Tx PMI need to be newly defined for CSI feedback. However, it may be difficult to newly define the N-Tx CSI-RS and the N-Tx PMI considering RS overhead or feedback overhead. In this regard, the present invention proposes a scheme for supporting massive MIMO feedback using an existing M-Tx (M<N) CSI-RS and M-Tx PMI.

As described above, CSI feedback overhead is considerably increased due to the introduction of massive MIMO. As a result, it may be difficult to report such CSI through periodic PUCCH (for example, PUCCH format 2) like the current LTE-A system. Therefore, in the present invention, entire CSI is categorized into a plurality of partial CSIs such as CSI-A and CSI-B in a state that CSI feedback overhead of the UE is increased, and a specific feedback period and offset are configured for each partial CSI and reported to the base station through individual periodic CSI feedback chain.

However, this method has a limitation. Since the feedback period and offset are configured semi-statically, partial CSI reporting cannot be managed dynamically. For example, if the CSI-B has a bursty variable property, it is effective that the UE requests the base station of a grant for aperiodic reporting for the CSI-B rather than reporting of a period determined semi-statically and the base station triggers aperiodic reporting. That is, partial CSI (for example, CSI-A) is fed back through a PUCCH periodically, and the other partial CSI (for example, CSI-B) is fed back through a PUSCH aperiodically. To this end, the UE may request the base station of a PUSCH CSI feedback trigger for CSI-B feedback transmission.

For convenience of description, although massive MIMO has been exemplarily described in the present invention, the method of the present invention may be applied to a random environment in addition to the massive MIMO.

<Method for Configuring CSI Process and Feedback Chain>

In the massive MIMO, CSI-RS and IMR, which are configured for CSI feedback to the UE, may be divided into two types as follows.

First of all, a part of massive antennas may be configured as CSI-RS in each of a plurality of CSI processes to allow the UE to feed back CSI per process. For example, a CSI process 1 and a CSI process 2 may be configured for one UE through higher layer signaling, that is, RRC layer signaling, and a CSI-RS 1 corresponding to a block A of FIG. 13 is configured for the CSI process 1, and a CSI-RS 2 corresponding to a block B of FIG. 13 is configured for the CSI process 2.

For example, CSI calculated from the CSI-RS 1 and IMR of the CSI process 1 may be referred to as CSI-A, and CSI calculated from the CSI-RS 2 and IMR of the CSI process 2 may be referred to as CSI-B. Alternatively, a part of a channel may be measured by the CSI-RS 1 and the CSI-RS 2, and entire channels, which are not seen by the CSI-RS 1 and the CSI-RS 2, may be estimated using the other RS, whereby CSI may be calculated for the estimated entire channels. The CSI for the entire channels may be divided into partial CSIs, which may be referred to as CSI-A and CSI-B.

As another massive MIMO feedback method, one CSI process may be configured for the UE through higher layer signaling, that is, RRC layer signaling, and the UE may feed back RI, PMI, and CQI, which may be achieved when all of the massive antennas are used, through the configured CSI process. At this time, one IMR and L number of CSI-RSs corresponding to massive MIMO antennas may be configured within one CSI process. That is, CSI process related information may be configured as illustrated in Table 6 below.

TABLE 6

| CSI process information = { IMR configuration, $1^{st}$ CSI-RS configuration, $2^{nd}$ CSI-RS configuration, . . . , $1^{st}$ CSI-RS configuration, $L^{nd}$ CSI-RS configuration } |
| --- |

In this method, the UE may estimate the entire channels from the L number of CSI-RSs, and may feed back the entire channels by dividing the entire channels into a plurality of {RI, PMI, CQI}. For example, CSI calculated from the first CSI-RS and IMR of the CSI process may be referred to as CSI-A, and CSI calculated from the second CSI-RS and IMR may be referred to as CSI-B. Alternatively, a part of a channel may be measured by the first CSI-RS and the second CSI-RS, and the other channels, which are not seen by the first CSI-RS and the second CSI-RS, may be estimated, whereby CSI may be calculated for the estimated entire channels. The CSI for the entire channels may be divided into partial CSIs, which may be referred to as CSI-A and CSI-B.

Hereinafter, a partial CSI reporting method will be described based on the aforementioned method for configuring a CSI process. Basically, the UE reports the CSI-A through the PUCCH periodically. If the CSI-B is needed to be reported due to update of the CSI-B, the UE requests aperiodic transmission of the CSI-B. An aperiodic transmission request signal of the CSI-B will be referred to as a request for aperiodic CSI feedback trigger (RA). Further, for reporting the RA related to the CSI-B, the UE mainly uses the periodic PUCCH feedback of CSI-A. However, this scheme can be extended to a case that there is not and the periodic PUCCH feedback of CSI-B is configured to the UE without the CSI-A. For example, when a periodic PUCCH feedback of CSI-B is configured to the UE, the UE may report channel information of CSI-B periodically and additionally report the RA related to the CSI-B via the periodic PUCCH feedback of CSI-B.

Figure 14:
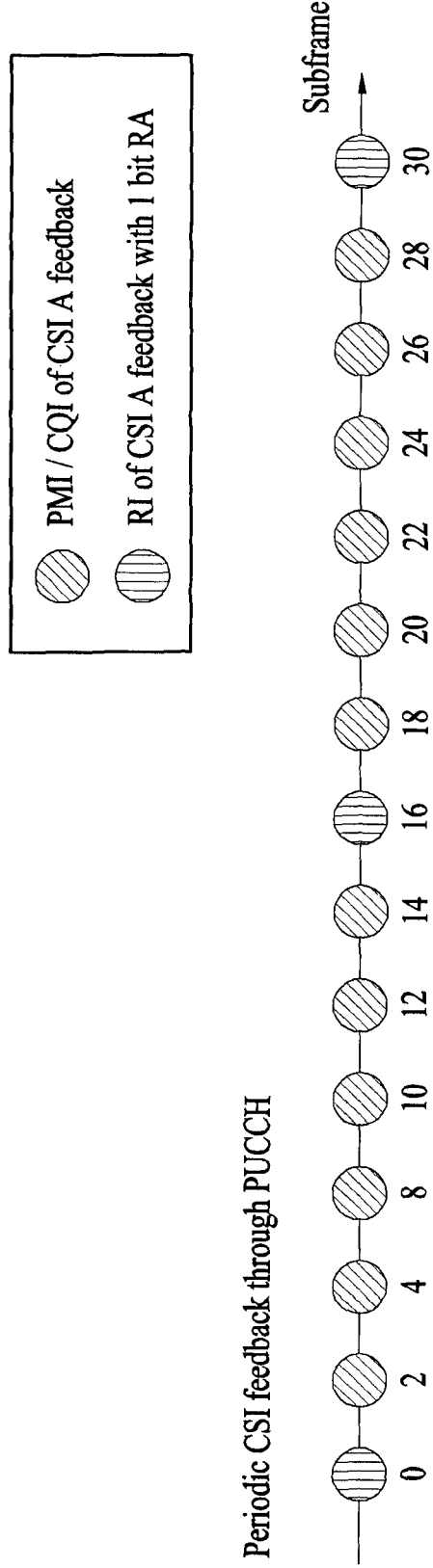
FIG. 14 is a diagram illustrating an example of CSI-A periodic feedback and RA transfer through a PUCCH according to the embodiment of the present invention.

FIG. 14 is a diagram illustrating an example of CSI-A periodic feedback and RA transfer through a PUCCH according to the embodiment of the present invention.

Referring to FIG. 14, it is noted that a CQI reporting period and an RI reporting period are 2 ms and 16 ms, respectively, and offset is 0. In particular, if the CSI-B is needed to be updated due to a channel change, the UE reports RA value of 0 or 1. However, although RA and RI are transmitted together in FIG. 14, they may be reported together with PMI/CQI. Further, RA can be reported singly via a periodic PUCCH chain, not with at least one of RI, PMI and CQI. A reporting period of RA may be determined as a multiple of the reporting period of RI. If the reporting period of RA is P, an offset of the reporting period of RA is configured an integer which is greater than (or equal to) 0 and less than (or equal to) $N_{pd}$ ($N_{pd}$=a reporting period of CQI), or the offset of the reporting period of RA may be configured an integer which is greater than (or equal to) 0 and less than (or equal to) $N_{pd}$−1. Or, the reporting period of RA may be determined as a multiple of No, and the offset of the reporting period of RA may be configured an integer which is greater than (or equal to) 0 and less than (or equal to) $N_{pd}$ ($N_{pd}$=a reporting period of CQI), or the offset of the reporting period of RA may be configured an integer which is greater than (or equal to) 0 and less than (or equal to) $N_{pd}$−1. That is, in a feedback without a periodic RI reporting, a period and an offset for the RA can be determined by using $N_{pd}$.

Figure 15:
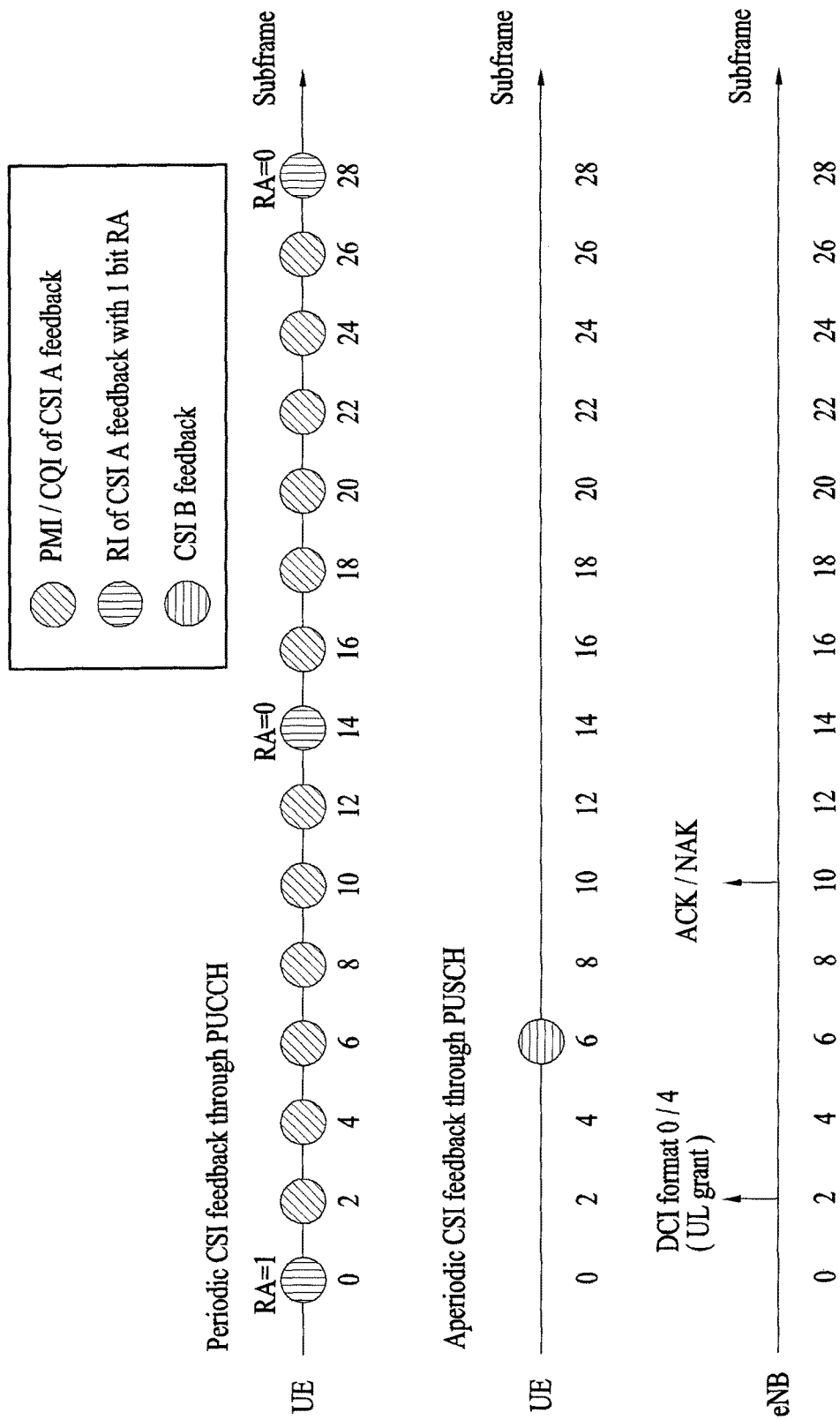
FIG. 15 is a diagram illustrating an example of partial CSI feedback according to the present invention.

FIG. 15 is a diagram illustrating an example of partial CSI feedback according to the present invention. In particular, in FIG. 15, it is assumed that CSI-A and RA are fed back periodically and an aperiodic CSI feedback trigger of the base station according to RA value is transferred to the UE.

Referring to FIG. 15, the UE requests the base station of aperiodic CSI feedback trigger by reporting RA=1 at a subframe 0. The base station triggers aperiodic CSI feedback by transmitting a DCI format 0/4 to the UE at an appropriate time by considering an uplink scheduling statue. That is, the base station receives RA and then determines when to trigger aperiodic CSI through the DCI format 0/4. Alternatively, after reporting RA=1, the UE may expect that the base station transmits the DCI format 0/4 after a subframe x. For example, x may be configured as 2 or 4.

In FIG. 15, the base station triggers CSI feedback through DCI at a subframe 2. At this time, the CSI process corresponding to the CSI-B should be triggered, and the CSI process corresponding to the CSI-B may be defined as a separate CSI process different from CSI-A as described above or may previously be defined as one CSI process by being grouped into the CSI process of the CSI-A.

In case of the former case, since the CSI process corresponding to the CSI-B is defined separately from the CSI process corresponding to the CSI-A, the CSI-B may only be triggered as before. However, in case of the latter case, since multiple CSI-RS resources is defined in one CSI process and thus the CSI-A and the CSI-B are defined in the same CSI process, new definition for triggering the CSI-B only is required. For example, when two subframe subsets are defined in one CSI process, one subframe subset which is triggered may be designated. Moreover, a CSI process which will perform CSI feedback, and its specific CSI-RS should be designated and then triggered. Alternatively, partial CSIs, that is, the CSI-A and the CSI-B may be selected and then triggered, and PMI, RI and CQI may be selectively triggered.

To this end, an aperiodic CSI report triggering field of a 2-bit size, which is defined in DCI, may newly be defined. That is, when each state of the aperiodic CSI report triggering field of the 2-bit size is designated by RRC signaling, the partial CSI and PMI, RI and CQI as well as CSI process index may be designated.

In FIG. 15, the UE that has received the CSI feedback trigger from the base station reports the CSI-B at a subframe 6. At this time, the UE may calculate the CSI-B with maintaining dependency with the CSI-A. For example, when calculating the CSI-B, the UE calculates an optimal CSI-B by considering CSI-A conventionally reported through a PUCCH and entire channels without calculating an optical value with only CSI-RS and IMR connected with the CSI-B. For example, the UE calculates PMI, RI and CQI of the optimal CSI-B, which may be transmitted through the entire channels, with reference to CSI-A reported through a PUCCH most recently prior to the subframe 6, that is, PMI at the subframe 6 and RI value at the subframe 0.

If the UE calculates the CSI-B by considering the CSI-A in accordance with the aforementioned description, it is preferable that the CSI-A is also calculated considering the CSI-B. However, it is preferable that the UE calculates the CSI-A semi-statically or statically by assuming the CSI-B value scheduled between the base station and the UE until the CSI-B is transmitted at the subframe 6. For example, the CSI-A is calculated on the assumption of RI=1 of the CSI-B and PMI=1 of the CSI-B.

Also, after the CSI-B is reported, the UE calculates the CSI-A on the basis of the CSI-B which is reported most recently. Also, after receiving ACK of the base station for the CSI-B, the UE may calculate the CSI-A on the basis of the CSI-B which is reported most recently. Although ACK/NACK for uplink control information (UCI) is not considered in the current LTE standard document, it is required to appropriately correct the current LTE standard document for the aforementioned operation, whereby the base station may transmit ACK/NACK for the UCI.

In more detail, according to the current LTE standard document, if UCI is subjected to piggyback for PUSCH data, ACK/NACK for PUSCH data is transmitted from the base station but ACK/NACK for UCI is not transmitted therefrom. Also, if UCI is transmitted independently, ACK/NACK is not transmitted. Therefore, if UCI is subjected to piggyback for PUSCH data, it is preferable that the base station performs cyclic redundancy check (CRC) for all of the PUSCH data and the UCI and then transmits ACK to the UE only if decoding for the PUSCH data and the UCI is successfully performed. Also, if the UCI is transmitted independently, the base station performs cyclic redundancy check (CRC) for the UCI and then transmits ACK to the UE only if decoding for the UCI is successfully performed.

Figure 16:
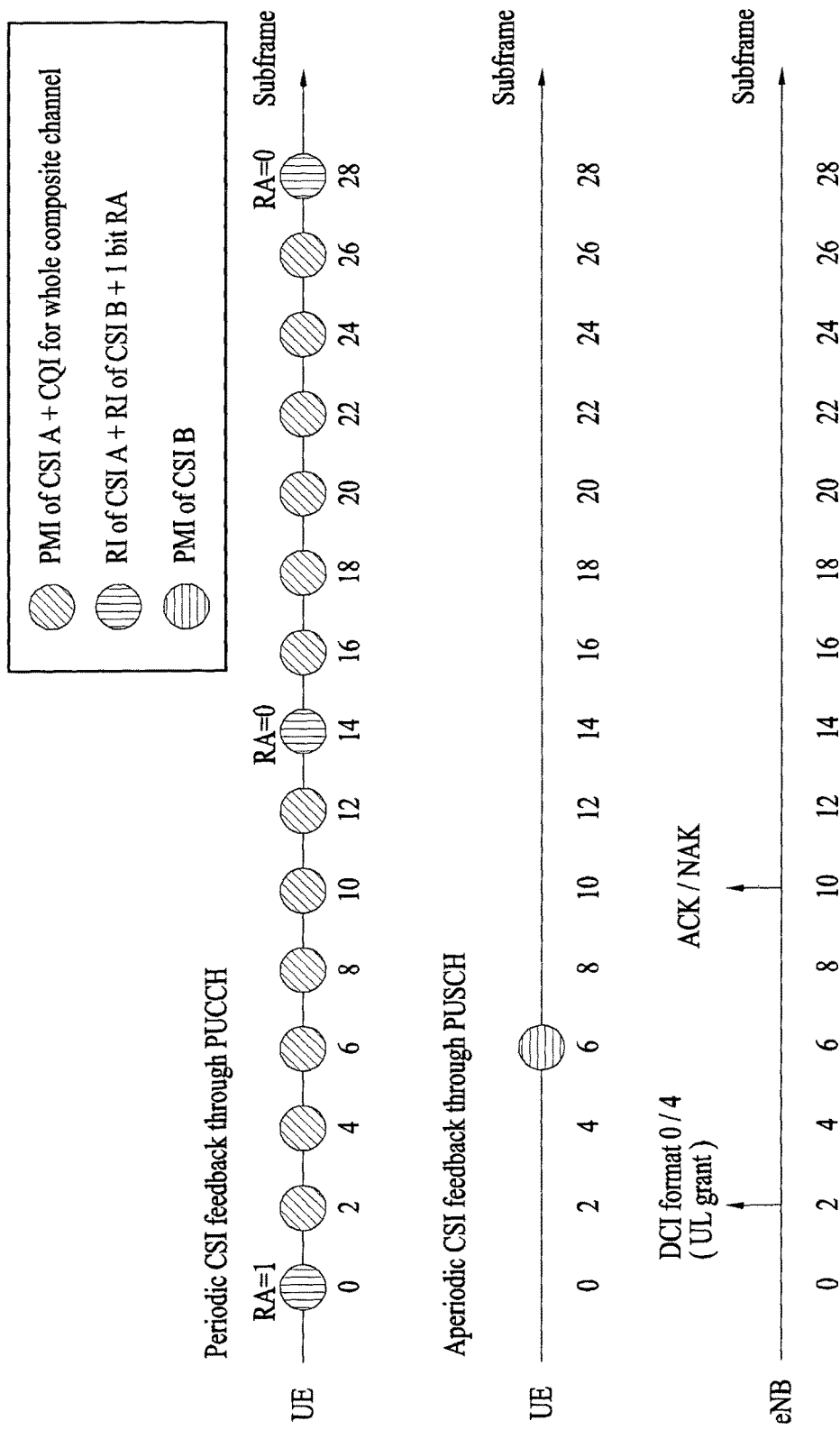
FIG. 16 is a diagram illustrating another example of partial CSI feedback according to the present invention.

FIG. 16 is a diagram illustrating another example of partial CSI feedback according to the present invention. In particular, in FIG. 16, partial information of the CSI-B is transmitted together with the CSI-A through a periodic PUCCH, and the other information of the CSI-B is transmitted through a PUSCH unlike FIG. 15. Also, CQI reported through a PUCCH means complete CQI that may be achieved by 3D MIMO through entire channels. The complete CQI is calculated by assuming PMI of the CSI-B as a specific value until PMI of the CSI-B is reported firstly. Of course, it is assumed that PMI of the CSI-B is configured semi-statically or statically and known by both the base station and the UE.

Referring to FIG. 16, if optimal PMI of a vertical channel is changed, the UE requests the base station of aperiodic CSI feedback trigger by reporting RA=1. PMI of the CSI-B is calculated based on RI of the CSI-B which is reported most recently through the PUCCH. Alternatively, the UE calculates optimal RI of the CSI-B together with PMI of the CSI-B in accordance with a current channel and reports the calculated result through a PUSCH together with complete CQI, which may be achieved by 3D MIMO through entire channels.

Meanwhile, in FIG. 16, the UE simultaneously transmits the PUSCH and the PUCCH at a subframe 6. In this case, a peak to average power ratio (PAPR) of the transmitted signals is increased, whereby signal distortion may occur. To prevent signal distortion from occurring, the UE may drop PUCCH CSI feedback at the subframe 6 and transmit PUCCH CSI feedback, which should be transmitted at the subframe 6, together with the CSI-B through the PUSCH. Alternatively, to avoid simultaneous transmission of the PUSCH and the PUCCH, the UE expects that the base station triggers PUSCH feedback by avoiding simultaneous transmission of the PUSCH and the PUCCH. That is, the base station triggers PUSCH feedback so as not to generate simultaneous transmission of the PUSCH and the PUCCH.

In the present invention, RA means information requested to the base station by the UE to trigger aperiodic CSI feedback. However, since RA is a signal transmitted when update of the CSI-B is required due to a channel change, RA may be interpreted as information notified by the UE to indicate that some channel corresponding to the CSI-B has been changed.

Also, although RA has a 1-bit size in the present invention, RA may be configured to have an n-bit size. For example, RA may be defined as a 2-bit size, and states 00, 01, 10 and 11 may indicate a changed level or request strength of a channel. For example, 00 indicates that a channel is not changed to update the CSI-B, 01 indicates that a channel is a little changed, and 11 indicates that a channel has been changed significantly.

Additionally, change of a channel may be defined by a changed level of CQI, which may be achieved when the CSI-B is updated. For example, 01 is reported when CQI of 16 level is changed to 2 level or less, and 11 is reported when CQI of 16 level is changed to 4 level or more. Even when request strength is represented through RA, a strong request, a weak request, etc. may be represented based on the level change of CQI.

Alternatively, the UE may request the base station to trigger aperiodic CSI feedback of a desired channel by using RA of an n-bit size. For example, the UE may request the base station to trigger feedback of a desired CSI process by defining RA as 2 bits and configuring states 01, 10 and 11 as feedback trigger requests for CSI processes 0, 1 and 2. Alternatively, if a plurality of CSI-RSs are defined for one CSI process or a plurality of subframe sets are defined for one CSI process, triggering for feedback for a specific CSI-RS or specific subframe set may be requested.

Moreover, the UE may request triggering of a corresponding partial CSI aperiodic CSI feedback by using RA of an n-bit size. For example, corresponding partial request information of CSI such as PMI, CQI and RI or a corresponding CSI request of CSI-A and CSI-B may be designated.

Of course, when RA of the n-bit size is used, what each state means should be scheduled between the base station and the UE semi-statically through RRC signaling or should be scheduled dynamically through DCI.

Figure 17:
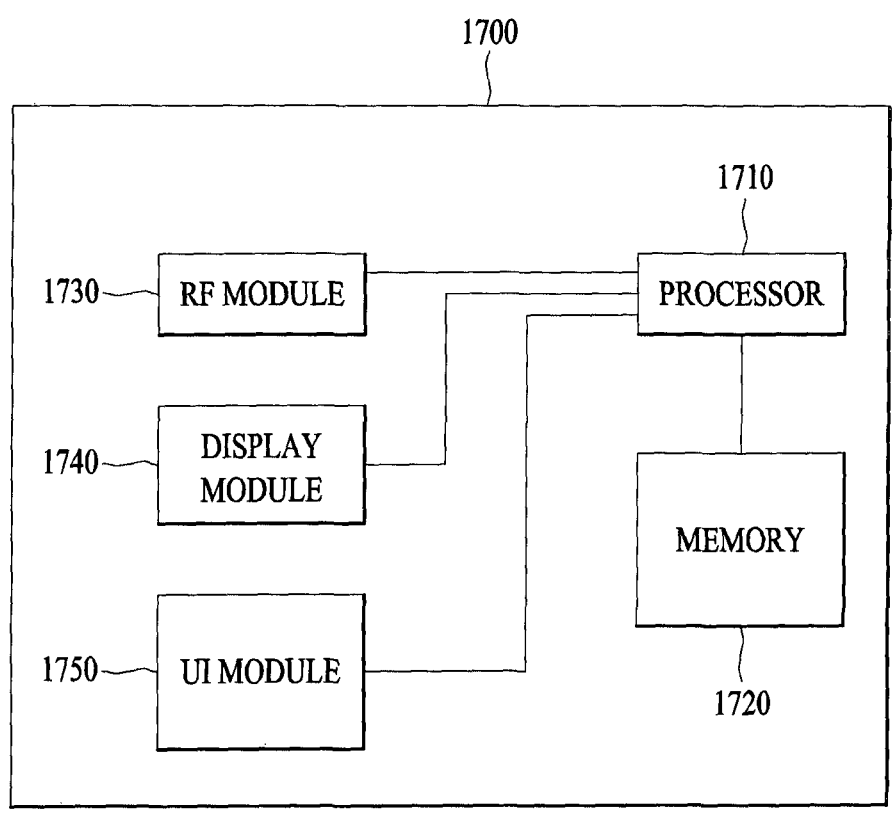
FIG. 17 is a block diagram of a communication apparatus according to an embodiment of the present invention.

FIG. 17 is a block diagram of a communication apparatus according to an embodiment of the present invention.

Referring to FIG. 17, a communication apparatus 1700 includes a processor 1710, a memory 1720, an RF module 1730, a display module 1740, and a User Interface (UI) module 1750.

The communication device 1700 is shown as having the configuration illustrated in FIG. 17, for the convenience of description. Some modules may be added to or omitted from the communication apparatus 1700. In addition, a module of the communication apparatus 1700 may be divided into more modules. The processor 1710 is configured to perform operations according to the embodiments of the present invention described before with reference to the drawings. Specifically, for detailed operations of the processor 1710, the descriptions of FIGS. 1 to 16 may be referred to.

The memory 1720 is connected to the processor 1710 and stores an Operating System (OS), applications, program codes, data, etc. The RF module 1730, which is connected to the processor 1710, upconverts a baseband signal to an RF signal or downconverts an RF signal to a baseband signal. For this purpose, the RF module 1730 performs digital-to-analog conversion, amplification, filtering, and frequency upconversion or performs these processes reversely. The display module 1740 is connected to the processor 1710 and displays various types of information. The display module 1740 may be configured as, not limited to, a known component such as a Liquid Crystal Display (LCD), a Light Emitting Diode (LED) display, and an Organic Light Emitting Diode (OLED) display. The UI module 1750 is connected to the processor 1710 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned method for feeding back partial CSI in a wireless communication system and the apparatus for the same have been described based on an example in which the method and apparatus are applied to a 3rd generation partnership project long term evolution (3GPP LTE) system. However, the method and the apparatus are applicable to various wireless communication systems in addition to the 3GPP LTE system.

The invention claimed is:

1. A method of reporting aperiodic channel status information (CSI) to a base station (BS) by a user equipment (UE) in a wireless communication system, the method comprising:
    receiving configuration information including at least two CSI reporting configurations based on a radio resource control (RRC) layer signaling;
    receiving an aperiodic CSI triggering information related to one of the at least two CSI reporting configurations via downlink control information (DCI) from the BS; and
    reporting the aperiodic CSI for the one of the at least two CSI reporting configurations to the BS,
    wherein the one of the at least two CSI reporting configurations is used for a CSI process and one of a first partial CSI or a second partial CSI related to the CSI process,
    wherein the one of the at least two CSI reporting configurations is used for one of a plurality of CSI processes and for reporting one of a first partial CSI related to the one of the plurality of CSI processes or a second partial CSI related to the one of the plurality of CSI processes,
    wherein the aperiodic CSI triggering information includes information indicating request strength of CSI triggering,
    wherein, when the aperiodic CSI triggering information is related to the second partial CSI, the aperiodic CSI triggering information includes a rank indicator (RI) of the first partial CSI.

2. The method of claim 1, wherein each of the first partial CSI and the second partial CSI includes one or two of a precoding matrix index (PMI), the RI and channel quality information (CQI),
    wherein the first partial CSI and the second partial CSI do not include all of the PMI, the RI and the CQI.

3. The method of claim 1, wherein the one of the plurality of CSI processes defines information about receiving a first channel status information-reference signal (CSI-RS) for the first partial CSI and a second CSI-RS for the second partial CSI.

4. A user equipment (UE) in a wireless communication system, the UE comprising:
    a radio frequency (RF) unit; and
    a processor connected with the RF unit and configured to receive configuration information including at least two channel status information (CSI) reporting configurations based on a radio resource control (RRC) layer signaling, receive an aperiodic CSI triggering information related to one of the at least two CSI reporting configurations via downlink control information (DCI)

from a base station (BS), and transmit the aperiodic CSI for the one of the at least two CSI reporting configurations to the BS, wherein the one of the at least two CSI reporting configurations is used for one of a plurality of CSI processes and for reporting one of a first partial CSI related to the one of the plurality of CSI processes or a second partial CSI related to the CSI process related to the one of the plurality of CSI processes, wherein the aperiodic CSI triggering information includes information indicating request strength of CSI triggering, wherein, when the aperiodic CSI triggering information is related to the second partial CSI, the aperiodic CSI triggering information includes a rank indicator (RI) of the first partial CSI.

5. The UE of claim 4, wherein each of the first partial CSI and the second partial CSI includes one or two of a precoding matrix index (PMI), the RI and channel quality information (CQI), wherein the first partial CSI and the second partial CSI do not include all of the PMI, the RI and the CQI.

6. The UE of claim 4, wherein the one of the plurality of CSI processes defines information about receiving a first channel status information-reference signal (CSI-RS) for the first partial CSI and a second CSI-RS for the second partial CSI.

* * * * *